United States Patent
Vinogradova et al.

(10) Patent No.: US 7,695,615 B2
(45) Date of Patent: Apr. 13, 2010

(54) FILTERING DEVICE

(75) Inventors: Marina Alekseevna Vinogradova, Saint-Petersburg (RU); Valery Victorovich Goryunov, Saint-Petersburg (RU); Alexei Leonidovich Kuzmin, Saint-Petersburg (RU); Alexander Vsevolodovich Pimenov, Saint-Petersburg (RU); Joseph Lvovich Shmidt, New York, NY (US)

(73) Assignee: OOO "Aquaphor", Saint-Petersburg (RU)

( * ) Notice: Subject to any disclaimer, the term of this patent is extended or adjusted under 35 U.S.C. 154(b) by 463 days.

(21) Appl. No.: 10/591,788

(22) PCT Filed: Mar. 18, 2005

(86) PCT No.: PCT/RU2005/000143

§ 371 (c)(1),
(2), (4) Date: Sep. 5, 2006

(87) PCT Pub. No.: WO2005/089898

PCT Pub. Date: Sep. 29, 2005

(65) Prior Publication Data

US 2007/0187315 A1    Aug. 16, 2007

(30) Foreign Application Priority Data

Mar. 22, 2004   (RU) .............................. 2004108585

(51) Int. Cl.
*B01D 24/06* (2006.01)
(52) U.S. Cl. ..................... 210/120; 210/131; 210/282; 210/291; 210/472
(58) Field of Classification Search ................. 210/85, 210/118, 120, 136, 289, 291, 436, 472, 496, 210/498, 282, 130, 131
See application file for complete search history.

(56) References Cited

U.S. PATENT DOCUMENTS

| 5,006,246 A * | 4/1991 | Edwards et al. | 210/264 |
| 5,049,272 A * | 9/1991 | Nieweg | 210/266 |
| 5,989,424 A * | 11/1999 | Serenko et al. | 210/266 |
| 6,841,067 B1 * | 1/2005 | Hofmann et al. | 210/266 |

* cited by examiner

*Primary Examiner*—Matthew O Savage
(74) *Attorney, Agent, or Firm*—Arent Fox LLP (57) ABSTRACT

The invention relates to a filtering device for liquid filters, mainly for potable water jug-type filters. The filtering device consists of a body filled with a filtering material and is provided with at least one outlet in the base of thereof, a lid having a water inlet and an air outlet, and at least one fixing means disposed between the body and the lid, wherein the fixing means is provided with at least one valve. The technical result achieved by use of declared the present is improving reliability and operating characteristics of the device.

11 Claims, 7 Drawing Sheets

FILTERING DEVICE

FIELD OF THE INVENTION

The invention relates to a filtering device for use in liquid filters, mainly for potable water jug-type filters.

PRIOR ART

The most known filtering devices (modules) consist of a body filled with a filtering material and a lid. The lid provided with a liquid inlets and air outlets. The bottom part of the body designed with the one or several filtered liquid outlets. Filtering module is inserted into a reservoir for a liquid. The liquid flows through lid holes and downwardly through filtering material. Cleaned liquid gets out through a hole (or holes) situated in the bottom part of the body to receiving tank (reservoir for cleaned water).

To avert filtering material, mainly an activated carbon, get into the water or pour out from a filtering device the material is located between two layings, sheets or nets. U.S. Pat. No. 4,283,283 (publication date: Aug. 11, 1981) discloses a water filter which consist of a tank for a water to be cleaned in a bottom part of which situated is a removable filtering cartridge with a cuff, and a receiving tank. Filtering cartridge is provided with activated carbon. Activated carbon granules are located between upper and lower sheets. The sheet may has the same diameter as diameter of the cuff and may be produced from any known filtering material. The upper part of the cuff of the cartridge includes a ring rib for holding the upper sheet. The external cartridge wall diameter is rather more than diameter of internal surface of receiving tank. These differences allow to create sealing when filtering cartridge is placed in the tank.

Known is a funnel with a cartridge for water filtering, in which granular material is located (U.S. Pat. No. 4,306,971. Publication date: Dec. 22, 1981). The cartridge is provided with two membranes with slit holes that has less size than granules of filtering material. The upper membrane used as a lid is embodied with a high tube which top has air outlets. Sealing is achieved by a ring hollow in the top of the cartridge and a ring projection in the internal wall of funnel bottom.

Known is a filtering cartridge for cleaning liquids that consist of a body and a lid with liquid inlets. The body provided with a granular material. The upper net is situated between the lid and the material, lower net is situated between the material and a body base and formed as a flat disk welded to the base. The lid and upper net are made in the form of a cone with holes at the top and are joined together at the certain points or along seams. Furthermore, the top part of lid includes a small dome, the sidewall of which has at least one hole that converged to the top. The width of the cut is smaller than granular material particle size. The both nets are made from nonwoven material, for instance, polypropylene or the like. The liquid to be cleaned flows through the lid holes and the net, then through granular material and lower net and get out through holes at the base of body (U.S. Pat. No. 5,049,272. Publication date: Sep. 17, 1991.—Prototype).

Described in the U.S. Pat. No. 5,505,120 (Publication date: Apr. 9, 1996) water filter used for coffee preparing consist of a ring-shaped body. The body with enlarged upper part is connected with the lower part by an incline rib. The body base is provided with cleaned water outlets. A filtering element, that situated in the body, consist of upper and lower surfaces of concave form which are made from polymeric material with a lot of holes. The layer of activated carbon with a big and small size of particle or argentiferous ion-exchange resin is situated between surfaces.

The filtering element according to the U.S. Pat. No. 5,980,743 (Publication date: Nov. 9, 1999) as well as the most of similar constructions, is made from the lid and the body filled with filtering material. Joining of the lid and body together is performed with welding method. For waterproof fixing the filtering element to the reservoir for water to be cleaned a prominent cuff is provided in the upper part of body. Sealing of the filtering element in the reservoir for water to be cleaned is achieved by use of a resin ring situated at the annular channel of the body. The base of the body is provided with circular outlets for cleaned water that are covered with the net, and the lid is provided with water inlets and air outlets. The filtering element between the lid and the body provided with the net made from polymeric hydrophilic materials and fixed at the ring. The part of the net is designed in form of convex camber. Convex elements of the net are sphere shaped. Furthermore, the net provided with ribs. This construction of the net is insufficient manufacturable. Similar embodiment of the filtering element with the net made from textile material is protected by U.S. Pat. No. 6,012,232 (Publication date: Apr. 11, 2000). The net material consists of two types of the fibers joined together: hydrophilic and hydrophobic fibers.

The cartridge construction consisting of a body with a cuff and water outlets in the base and a lid made in two layers is disclosed in the U.S. Pat. No. 5,989,424 (Publication date: Nov. 23, 1999). The top of the lid has slit air outlets. The side surface of the lower part of the lid is provided with slit water inlets, the horizontal surface is provided with a means for reminding of a user about ending of the filtering cartridge durability and its replacing. The reminder means is frequently used symbol scale, for instance a picture of months. Granular sorbent placed inside the cartridge is located between two layers of polymeric fibers, for example, polyethylene.

Use of a fixation unit made in form of a net, a membrane or a laying in said filtering devices frequently results in reducing speed or stop the filtering process because of an air bubble, which appears under the fixation means which results in closing its effective cross-section. The explaining of forming air bubble is that while passing of a liquid through the filtering material, air situated between granules and fibers is forced out upward and is accumulated under the fixation unit of filtering material.

SUMMARY OF INVENTION

The main purpose of claimed invention is to improve the reliability and operating characteristics of the device.

The purpose is solved by a filtering device consisting of a body filled with a particulate filtering material and provided with at least one outlet in the base of it, a lid provided with water inlets and air outlets and at least one fixing means disposed between the body and the lid for preventing the particulate filtering material from escaping from the body through the water inlets and the air outlets, wherein the fixing means is formed from a flexible polymeric material and is provided with at least one slit formed therein thereby defining a valve for providing increasing water filtering efficiency. The shape of the valve is expressed by: to $1 \leq L_p/L_o \leq 2$, where: $L_p$—the length along the perimeter; $L_o$—the length of the slit. The width of the slit increases to a width that is at least twice the width of the slit in the closed position during the time when liquid or gas is flowing through it. Furthermore, the width of the slit in the closed position is less than a size of the particulate filtering material and is expressed by the following relationship: $0.1L_o \leqq d \leqq 3L_o$, where: d—the width of the valve; $L_o$—the length of the valve.

The body or the lid has a cuff providing a possibility of scaling for creating high specific pressure at the top part of it. The cuff is embodied as a cone and comprises at least one collar on the external surface thereof. The cuff can be provided with from one to five collars, preferably from one to three.

The air outlets are embodied on the lid in such a way that it is possible to determine a time when the device is mounted and/or replaced, for example in the form of numbers and/or letters.

BRIEF DESCRIPTION OF THE DRAWINGS

The invention disclosure is accompanied with drawings, in which.

EMBODIMENT OF THE INVENTION

Figure 1:
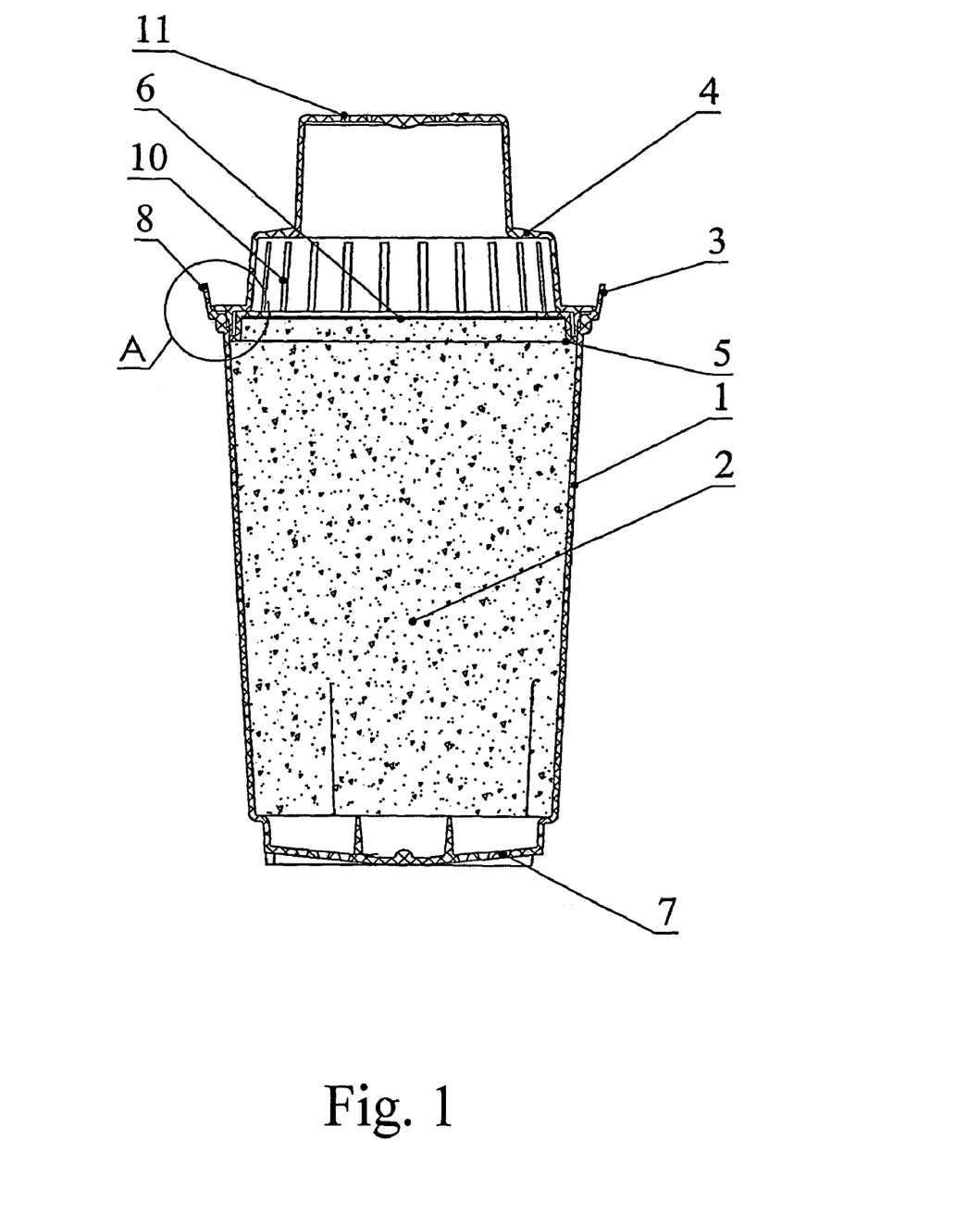
FIG. 1 shows an overall view of embodiment of the filtering device, in which a body is embodied with a cuff.
Figure 2:
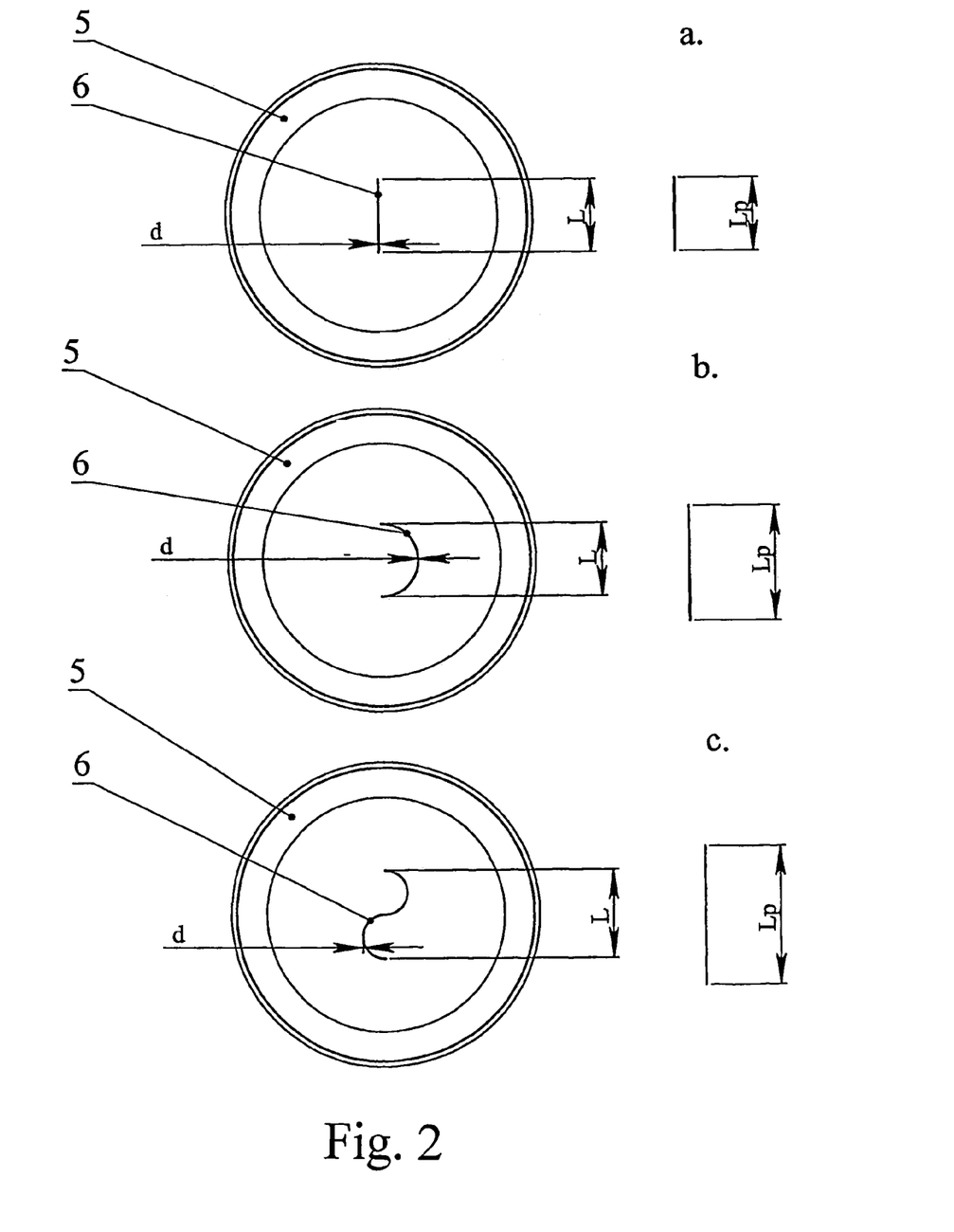
FIG. 2 shows an overall view of embodiment of the fixing means.
Figure 3:
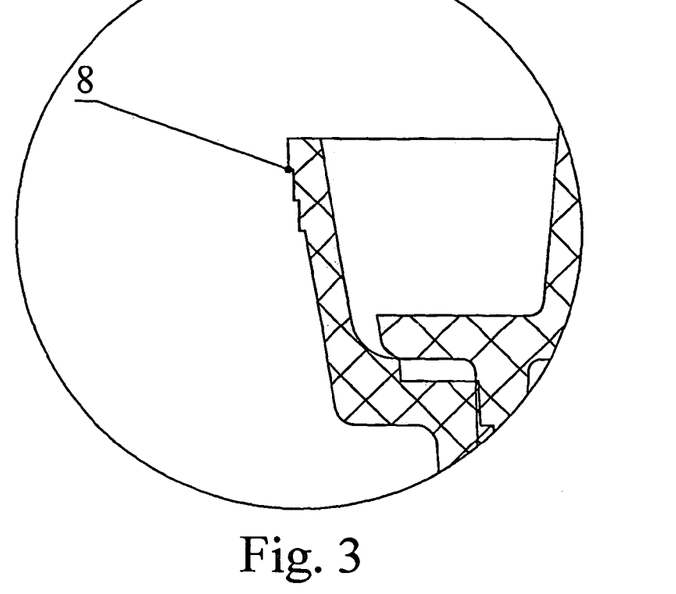
FIG. 3 shows view of the cuff.
Figure 4:
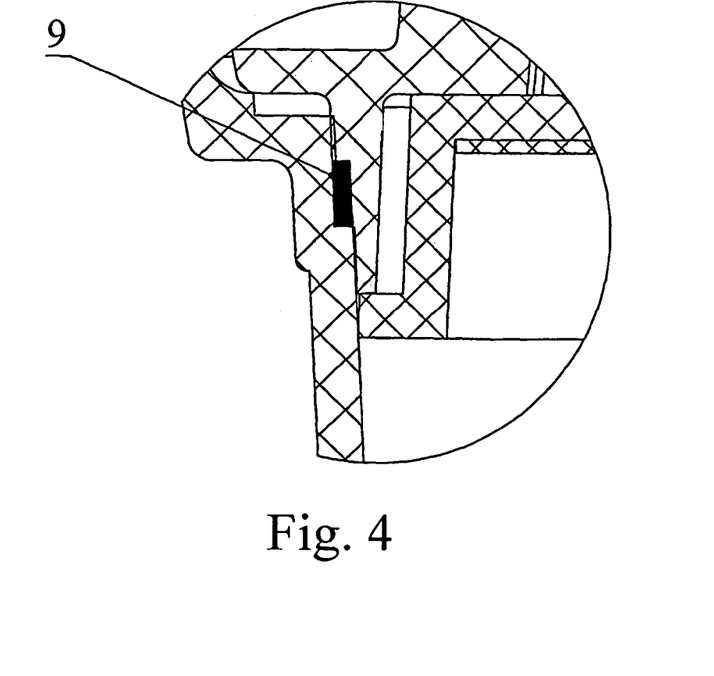
FIG. 4 shows unit A of FIG. 1.
Figure 5:
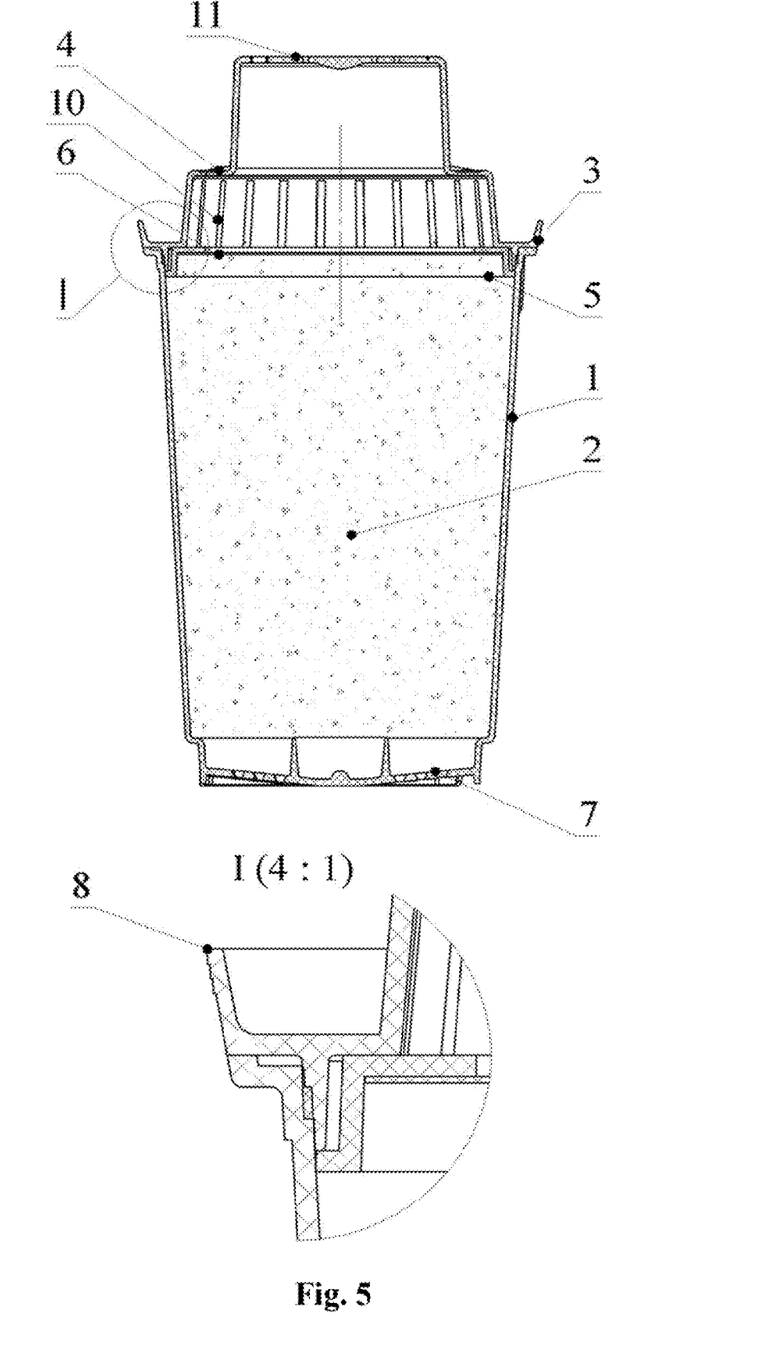
FIG. 5 shows an overall view of embodiment of the filtering device, in which a lid is embodied with a cuff.
Figure 6:
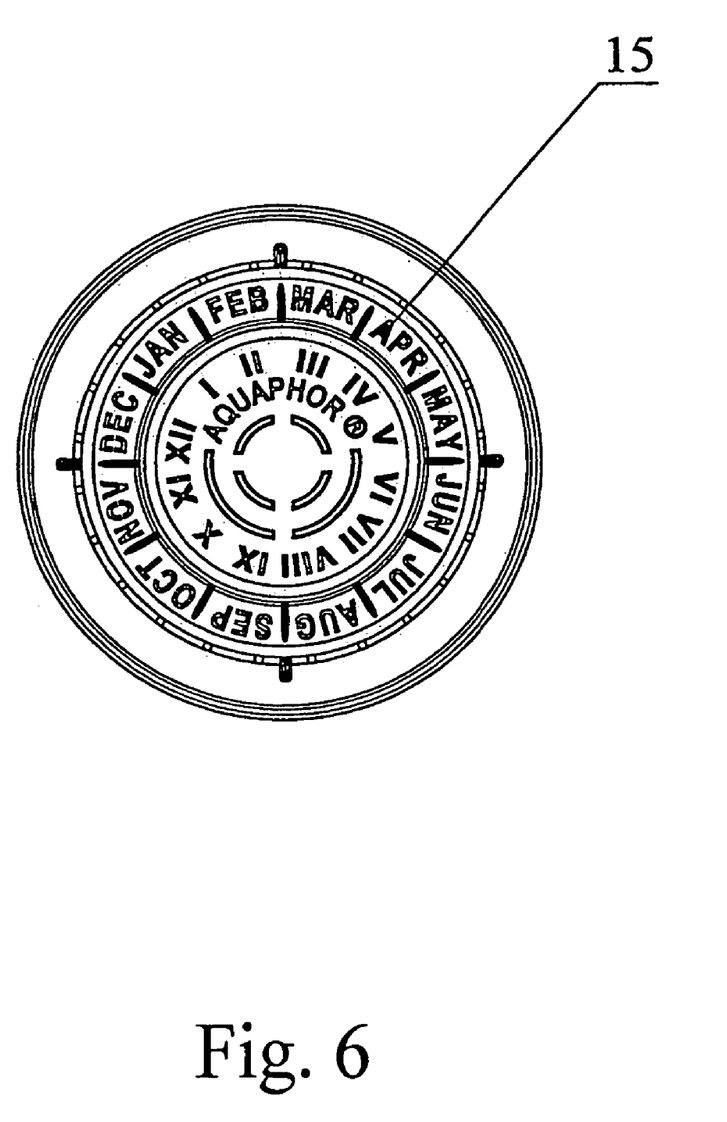
FIG. 6 shows a top view of the lid.
Figure 7:
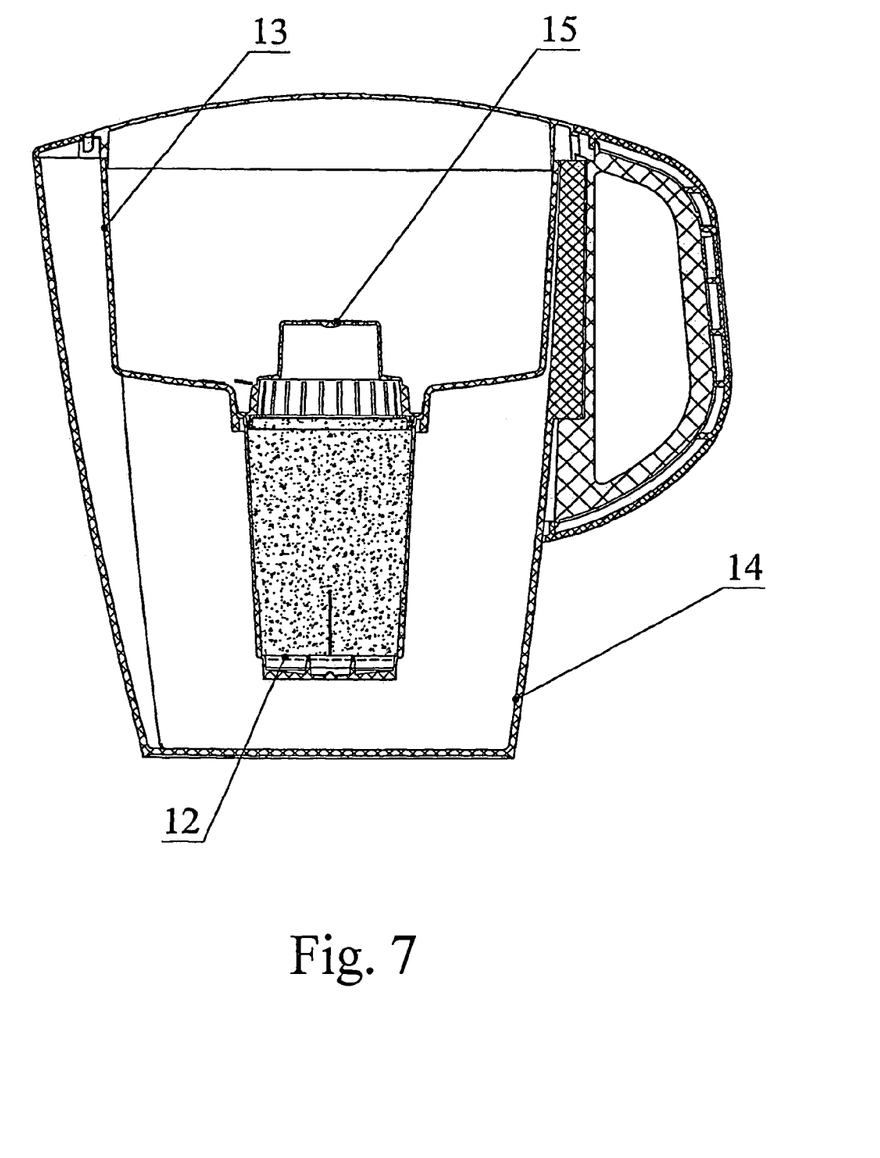
FIG. 7 shows an overall view of the jug-type filter with filtering device.

The filtering device (FIG. 1) consist of a body 1 filled with a filtering material 2 and a cuff 3, a lid 4 and a fixing means 5 with valve 6 of prescribed form, width and length (FIG. 1, 2). The base of the body is designed with cleaned water outlets 7. The body 1 is provided with the cone shape cuff 3, which external surface comprises at least one collar 8 for increasing the reliability of fixing and sealing of the filtering device on the tank for the cleaning water (FIG. 1, 3). The body cuff provides a possibility to increase the construction reliability of the filtering device itself, i.e. to keep sealing properly for a long time owing to ferrule deformation is not happen and, correspondingly, the possibility of falling of uncleaned liquid into the tank for the cleaned liquid is excluded. Furthermore, such construction allows to produce a device of bigger size since the strength characteristics and flexibility of the cuff it saves, and this promotes improving of the operating characteristics. The lid 4 embodied with the base 9 (FIG. 1, 4) and liquid inlets 10 and air outlets 11. The air outlets are formed on the lid in such a way that it is possible to determine a time when the device is mounted and/or replaced, for example in form of numbers and/or letters (FIG. 6). The width of the holes embodied in form of numbers and/or letters should be no less than 0.3 mm. The underside of the base 9 is provided with the collar for joining the lid to the internal surface of the body, for example, by welding. The fixing means 5 consisting of a polymeric material and the ring joined together, for example by hot sealing method, mechanically mounted in the body 1 or in the lid 4 excludes the possibility the liquid to flow by-passing the valve. To improve the reliability of construction of the filtering device the lid 4 can be embodied with the cone shaped cuff with at least one collar at the external surface of it. In said embodiment of the lid the body correspondingly has no the cuff (FIG. 5). The fixing means 12 can be placed between filtering material and base of the body (FIG. 7).

The embodiment of the fixing means 5 with the valve 6 of prescribed shape, width and length (FIG. 2) allows to avoid breaking of liquid filtering process, which take place due to accumulating an air in the cartridge. Since fixing means 5 is embodied from flexible polymeric material, for example polyester, polyamide, polyolefin, the valve 6 is opening and it size increasing at the expense of edge mobility not less than in two times during filtering process due to swelling of the filtering material and during passing of the air that accumulated between filtering material particles and being displaced with water. At the same time the air flows out through it. Maximum width of the valve 6 in the closed position is less than size of the filtering material particles and should be corresponded to relation $0.1L \leqq d \leqq 3L_o$.

As polymeric material may be used a woven, a nonwoven material, a film. Non porous polymeric film has the thickness from 5 to 100 microns or porous polymeric material has the thickness from 5 to 500 microns, preferably from 25 to 100 microns, the porous size may be from 10 to 200 microns.

Fibrous and/or friable materials or it blends may be used as filtering material 2.

The filtering device can be produced with the help of operating equipment, for example, machine for pressure die casting of thermoplastic materials of VL-40 type, for example from polypropylene.

The filtering device for liquid filters works as follows.

Liquid filter, for example of jug type consists from receiving 13 tank for liquid to be cleaned (funnel for liquid to be cleaned), a tank 14 for cleaned liquid and removable filtering device—module 15. Filtering module 15 is inserted in the hole of the tank 13 for liquid to be cleaned. Incoming in the filter liquid for cleaning is filtering through module 15. Uncleaned liquid comes to inside of the filtering module through available inlets and flows through the fixing means 5 and the valve 6, in case of use of porous filtering material, or only through the valve 6, in case of use of not porous material, and then through filtering material 2. The liquid cleaned from various pollutions leaves through outlets presented in the base of the body 1. At the same time, the air accumulated between particles of filtering materials is displaced by liquid and comes out through opened during filtering process valve 6 and then comes out through outlets of the lid 4. So that the liquid filtering process goes without filtering breaking.

Thus, the disclosed construction used in the liquid filters, has improved operating characteristics and reliability.

The invention claimed is:

1. A filtering device consisting of a body filled with a particulate filtering material and having at least one outlet in a base of the body, a lid provided with water inlets and air outlet outlets and at least one fixing means for preventing the particulate filter material from escaping the body through said water inlets and said air outlets disposed between the body and the lid, characterized in that the fixing means is formed of a flexible polymeric material and has at least one slit formed therein, wherein the slit has a width that is less than a size of the particulate filter material in a closed position and can open to a width that is at least twice the width in the closed position to permit liquid or gas to flow there-through thereby defining a valve.

2. The filtering device as claimed in claim 1, characterized in that the shape of the slit corresponds to $1L_p/L_o \leqq 2$, where: $L_p$—the length along the perimeter; $L_o$—the length of the valve slit.

3. The filtering device as claimed in claim 2, characterized in that the width of the slit in the closed position corresponds to $0.1L_o \leqq d \leqq 3L_o$, where: d—the width of the valve; L—the length of the slit.

4. The filtering device as claimed in claim 1, characterized in that the body is provided with a cuff configured to sealing providing high specific pressure at the top part of it.

5. The filtering device as claimed in claim 4, characterized in that the cuff is cone-shaped and comprises at least one collar on the external surface thereof.

6. The filtering device as claimed in claim 5, characterized in that the cuff has from one to five collars on the external surface thereof.

7. The filtering device as claimed in claim 6, characterized in that the cuff has preferably from one to three collars.

8. The filtering device as claimed in claim 1, characterized in that the lid has a cuff configured to provide sealing providing high specific pressure at the top part of it.

9. The filtering device as claimed in claim 8, characterized in that the cuff is embodied in the form of a cone and comprises at least one collar on the external surface thereof.

10. The filtering device as claimed in claim 9, characterized in that the cuff has from one to five collars on the external surface thereof.

11. The filtering device as claimed in claim 10, characterized in that the cuff has preferably from one to three collars.

* * * * *